US011626774B1

(12) United States Patent
Gray-Cingcade (10) Patent No.: US 11,626,774 B1
(45) Date of Patent: Apr. 11, 2023

(54) ENERGY GENERATION SYSTEM AND METHOD USING ELECTROMAGNETS

(71) Applicant: Chad Gray-Cingcade, San Antonio, TX (US)

(72) Inventor: Chad Gray-Cingcade, San Antonio, TX (US)

( * ) Notice: Subject to any disclaimer, the term of this patent is extended or adjusted under 35 U.S.C. 154(b) by 0 days.

(21) Appl. No.: 17/892,722

(22) Filed: Aug. 22, 2022

Related U.S. Application Data

(60) Provisional application No. 63/328,409, filed on Apr. 7, 2022.

(51) Int. Cl.
| H02K 16/00 | (2006.01) |
| H02K 7/18 | (2006.01) |
| H02K 11/21 | (2016.01) |
| H02K 7/00 | (2006.01) |

(52) U.S. Cl.
CPC .......... *H02K 7/1807* (2013.01); *H02K 7/003* (2013.01); *H02K 11/21* (2016.01)

(58) Field of Classification Search
CPC ....... H02K 7/1807; H02K 11/21; H02K 7/003
USPC ...................................... 310/68 B
See application file for complete search history.

(56) References Cited

U.S. PATENT DOCUMENTS

| 4,571,528 | A | | 2/1986 | McGee et al. |
| 5,594,289 | A | | 1/1997 | Minato |
| 5,731,649 | A | * | 3/1998 | Caamano ................ H02K 1/02 |
| | | | | 310/43 |
| 7,233,087 | B2 | | 6/2007 | Watson |
| 9,413,214 | B2 | | 8/2016 | Giummo |
| 9,923,501 | B2 | * | 3/2018 | Rabal ................... H02K 7/025 |
| 11,088,608 | B2 | | 8/2021 | Kaul |
| 2002/0158531 | A1 | | 10/2002 | Aritaka |
| 2005/0023916 | A1 | | 2/2005 | Moe |
| 2011/0304232 | A1 | | 12/2011 | Rush |
| 2012/0091843 | A1 | | 4/2012 | Gore |
| 2014/0354119 | A1 | * | 12/2014 | Shishido .............. H02P 29/662 |
| | | | | 310/68 B |

FOREIGN PATENT DOCUMENTS

| WO | 2008122437 A2 | 10/2008 |
| WO | 2012068708 A1 | 5/2012 |

* cited by examiner

*Primary Examiner* — Terrance L Kenerly
(74) *Attorney, Agent, or Firm* — Bold IP, PLLC (57) ABSTRACT

A system and method that converts rotational movement of a crank shaft into electrical energy is provided. The crank shaft is caused to rotate using a series of electromagnets powered by a power source. The electromagnets are arranged to encircle and magnetically affect a central magnet coupled to the shaft. The system effectively amplifies the energy supplied from the power source and saves the resulting excess energy to an energy storage device.

20 Claims, 12 Drawing Sheets

| Start-up V1 | | |
|---|---|---|
| Magnet | # On Sec / X Off | |
| 1 | .5 to 3.5 | X |
| 2 | .5 to 3.5 | X |
| 3 | X | .5 to 3.5 |
| 4 | X | .5 to 3.5 |
| 5 | .5 to 3.5 | X |
| 6 | .5 to 3.5 | X |
| 7 | X | .5 to 3.5 |
| 8 | X | .5 to 3.5 |

FIG. 11

| Running V1 | | | | |
|---|---|---|---|---|
| Magnet | # On Sec / X Off | | | |
| 1 | .5 to 5 | x | x | x |
| 2 | x | .5 to 5 | x | x |
| 3 | x | x | .5 to 5 | x |
| 4 | x | x | x | .5 to 5 |
| 5 | .5 to 5 | x | x | x |
| 6 | x | .5 to 5 | x | x |
| 7 | x | x | .5 to 5 | x |
| 8 | x | x | x | .5 to 5 |

FIG. 12

| Start-up V2 | | | |
|---|---|---|---|
| Magnet | # On Sec / X Off | | |
| 1 | 1.5 to 4.5 | x | x |
| 2 | x | 1.5 to 4.5 | x |
| 3 | x | x | 1.5 to 4.5 |
| 4 | 1.5 to 4.5 | x | x |
| 5 | x | 1.5 to 4.5 | x |
| 6 | x | x | 1.5 to 4.5 |
| 7 | 1.5 to 4.5 | x | x |
| 8 | x | 1.5 to 4.5 | x |
| 1 | x | x | 1.5 to 4.5 |

FIG. 13

| Running V2 | | | | | | | | | | |
|---|---|---|---|---|---|---|---|---|---|---|
| Magnet | # On Sec / X Off | | | | | | | | | |
| 1 | .5 to 10 | X | X | X | X | X | X | X | X | X |
| 2 | X | .5 to 10 | X | X | X | X | X | X | X | X |
| 3 | X | X | .5 to 10 | X | X | X | X | X | X | X |
| 4 | X | X | X | .5 to 10 | X | X | X | X | X | X |
| 5 | X | X | X | X | .5 to 10 | X | X | X | X | X |
| 6 | X | X | X | X | X | .5 to 10 | X | X | X | X |
| 7 | X | X | X | X | X | X | .5 to 10 | X | X | X |
| 8 | X | X | X | X | X | X | X | X | X | .5 to 10 |

ENERGY GENERATION SYSTEM AND METHOD USING ELECTROMAGNETS

CROSS-REFERENCE TO RELATED APPLICATIONS

This application claims priority to U.S. Provisional Application No. 62/328,409 filed Apr. 7, 2022, the entire contents of which are hereby fully incorporated herein by reference for all purposes.

FIELD OF THE INVENTION

This invention relates to generating energy, including generating electrical energy using electromagnets.

BACKGROUND

The world is reliant on fossil fuels, however, fossil fuels cause pollution, are relatively inefficient, and are in limited supply.

Accordingly, there is a need for a system and method for generating electrical power using electromagnets.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

SUMMARY

According to one aspect, one or more embodiments are provided below for an energy amplification system comprising a drive shaft configured to rotate, a first magnet coupled to the drive shaft, a plurality of electromagnets assembled to encircle the first magnet, each one of the plurality of electromagnets configured with a corresponding relay switch, an electric generator configured with the drive shaft and adapted to convert rotational movement of the drive shaft into electrical energy, a power source electrically configured with each relay switch, and a controller configured to selectively activate one or more of the relay switches according to one or more predetermined timing patterns, wherein at least one of the plurality of electromagnets produces a magnetic force that causes the first magnet and the drive shaft to rotate.

In another embodiment, the energy amplification system further comprises a power storage device configured with the electric generator and adapted to store the electrical energy.

In another embodiment, the plurality of electromagnets includes a total of eight electromagnets.

In another embodiment, the eight electromagnets are arranged in an octagonal layout about the first magnet.

In another embodiment, a first one of the one or more predetermined timing patterns includes a start-up sequence of electromagnet activations.

In another embodiment, a first one of the one or more predetermined timing patterns includes a running sequence of electromagnet activations.

In another embodiment, the energy amplification system comprises a timing sensor configured with the drive shaft and adapted to sense a rotational speed of the drive shaft.

In another embodiment, the plurality of electromagnets includes a first electromagnet, a second electromagnet, a third electromagnet, a fourth electromagnet, a fifth electromagnet, a sixth electromagnet, a seventh electromagnet, and an eighth electromagnet, and the controller includes at least one processor, at least one non-transitory memory unit coupled with the at least one processor, computer readable instructions embodied in the memory unit and executable by the processor, and execution of the instructions by the processor causes the controller to perform a method, the method comprising: activating the first, second, fifth, and sixth electromagnets; deactivating the first, second, fifth, and sixth electromagnets; activating the third, fourth, seventh, and eighth electromagnets; and deactivating the third, fourth, seventh, and eighth electromagnets.

In another embodiment, the plurality of electromagnets includes a first electromagnet, a second electromagnet, a third electromagnet, a fourth electromagnet, a fifth electromagnet, a sixth electromagnet, a seventh electromagnet, and an eighth electromagnet, and the controller includes at least one processor, at least one non-transitory memory unit coupled with the at least one processor, computer readable instructions embodied in the memory unit and executable by the processor, and execution of the instructions by the processor causes the controller to perform a method, the method comprising: activating the first and fifth electromagnets; deactivating the first and fifth electromagnets; activating the second and sixth electromagnets; deactivating the second and sixth electromagnets; activating the third and seventh electromagnets; and deactivating the third and seventh electromagnets.

In another embodiment, the plurality of electromagnets includes a first electromagnet, a second electromagnet, a third electromagnet, a fourth electromagnet, a fifth electromagnet, a sixth electromagnet, a seventh electromagnet, and an eighth electromagnet, and the controller includes at least one processor, at least one non-transitory memory unit coupled with the at least one processor, computer readable instructions embodied in the memory unit and executable by the processor, and execution of the instructions by the processor causes the controller to perform a method, the method comprising: activating the first electromagnet; deactivating the first electromagnet; activating the second electromagnet; deactivating the second electromagnet; activating the third electromagnet; deactivating the third electromagnet; activating the fourth electromagnet; deactivating the fourth electromagnet; activating the fifth electromagnet; deactivating the fifth electromagnet; and activating the sixth electromagnet; deactivating the sixth electromagnet.

According to another aspect, one or more embodiments are provided below for a method of amplifying energy comprising: (A) providing a drive shaft configured to rotate, (B) coupling a first magnet to the drive shaft, (C) providing a plurality of electromagnets in an encircling arrangement about the first magnet, each one of the plurality of electromagnets configured with a corresponding relay switch, (D) configuring an electric generator with the drive shaft adapted to convert rotational movement of the drive shaft into electrical energy, (E) providing, using a power source, electrical energy to each relay switch, (F) causing a controller to selectively activate one or more of the relay switches according to one or more predetermined timing patterns, wherein at least one of the plurality of electromagnets produces a magnetic force that causes the first magnet and the drive shaft to rotate.

In another embodiment, the method further comprises: (G)configuring a power storage device with the electric generator to store the electrical energy.

In another embodiment, the method further comprises: configuring a timing sensor with the drive shaft to sense a rotational speed of the drive shaft.

In another embodiment, the plurality of electromagnets includes a first electromagnet, a second electromagnet, a third electromagnet, a fourth electromagnet, a fifth electromagnet, a sixth electromagnet, a seventh electromagnet, and an eighth electromagnet, and the one of the one or more predetermined timing patterns includes: activating the first, second, fifth, and sixth electromagnets; deactivating the first, second, fifth, and sixth electromagnets; activating the third, fourth, seventh, and eighth electromagnets; and deactivating the third, fourth, seventh, and eighth electromagnets.

In another embodiment, the plurality of electromagnets includes a first electromagnet, a second electromagnet, a third electromagnet, a fourth electromagnet, a fifth electromagnet, a sixth electromagnet, a seventh electromagnet, and an eighth electromagnet, and the one of the one or more predetermined timing patterns includes: activating the first and fifth electromagnets; deactivating the first and fifth electromagnets; activating the second and sixth electromagnets; deactivating the second and sixth electromagnets; activating the third and seventh electromagnets; and deactivating the third and seventh electromagnets.

In another embodiment, the plurality of electromagnets includes a first electromagnet, a second electromagnet, a third electromagnet, a fourth electromagnet, a fifth electromagnet, a sixth electromagnet, a seventh electromagnet, and an eighth electromagnet, and the one of the one or more predetermined timing patterns includes: activating the first electromagnet; deactivating the first electromagnet; activating the second electromagnet; deactivating the second electromagnet; activating the third electromagnet; deactivating the third electromagnet; activating the fourth electromagnet; deactivating the fourth electromagnet; activating the fifth electromagnet; deactivating the fifth electromagnet; activating the sixth electromagnet; and deactivating the sixth electromagnet.

Other aspects and advantages of the invention will be apparent from the following description and the appended claims.

DETAILED DESCRIPTION OF EXEMPLARY EMBODIMENTS

In general, the presently disclosed energy generation system and method relates to a system and method that converts rotational movement of a crank shaft into electrical energy. The crank shaft is caused to rotate using a series of electromagnets arranged to encircle and magnetically affect a central magnet coupled to the shaft.

Figure 1:
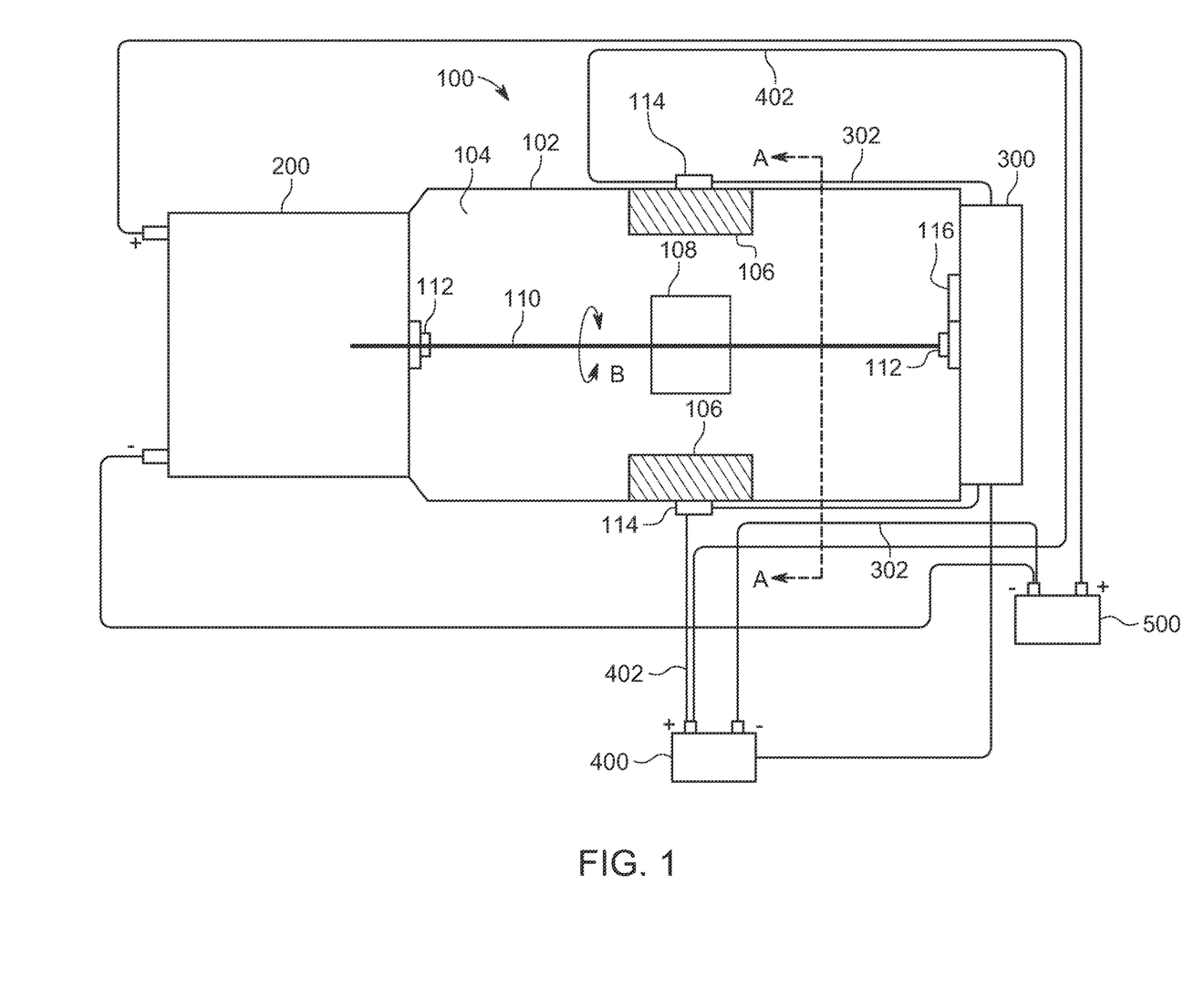
FIG. 1 shows a cutaway side view of an energy generation system according to exemplary embodiments hereof.

In some embodiments, as shown in FIG. 1, the energy generating system 10 (also referred to herein as simply the system 10) includes an electromagnet movement assembly 100, an electric generator 200, a controller 300, a power source 400, and an energy storage device 500. The system 10 also may include other elements and/or components as necessary to perform its functionalities.

In general, the electromagnet movement assembly 100 uses pulsed electromagnets to cause an internal crank shaft to rotate. The crank shaft is configured with the electric generator 200 which converts the rotational motion of the shaft into electrical energy. The generated energy is stored in the energy storage device 500. The controller 300 controls the pulsing of the electromagnets (e.g., via relay switches) as well as the electrical energy level(s) supplied to the electromagnets via the power source 400. In this way, the system 10 effectively amplifies the energy supplied from the power source 400 and saves the resulting excess energy to the energy storage device 500.

The energy generating system 10 will next be described in detail with respect to FIGS. 1-9B.

Figure 2:
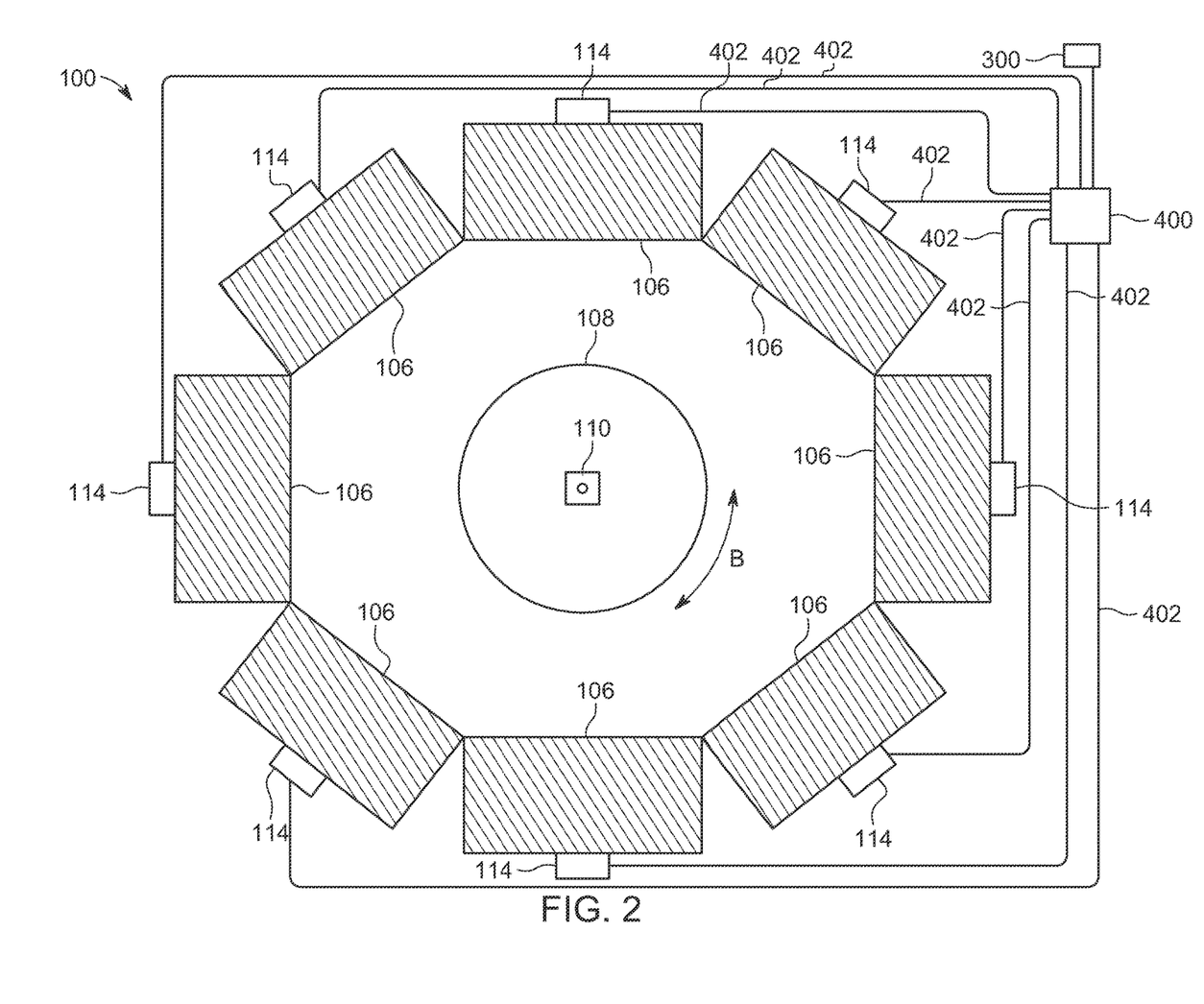
FIG. 2 shows a cutaway top view of an energy generation system according to exemplary embodiments hereof.

In some embodiments, as shown in FIGS. 1 and 2, the electromagnet movement assembly 100 includes a housing 102 (preferably aluminum) with an inner volume 104 adapted to generally house the various elements of the electromagnet movement assembly 100 to provide support and protection thereto. FIG. 1 shows a side cutaway view of the system 10 and FIG. 2 shows a sectional view of the system 10 of FIG. 1 taken from the perspective of cutlines A-A. As shown, within the inner volume 104, a series of electromagnets 106 are configured to generally encircle a central magnet 108 coupled to a rotatable crank shaft 110.

In some embodiments, as shown in FIG. 1, the crank shaft 110 extends across a portion of the housing's 102's inner volume 104 and is supported on either side by rotational bearing mounts 112 (e.g., a left bearing mount 112 and a right bearing mount 112). In this way, the crank shaft 110 is configured to freely rotate about the rotational bearing mounts 112 in the direction of the arrow B (e.g., clockwise and/or counterclockwise as described in other sections). It is preferable that the bearing mounts 112 are low friction mounts so that the crank shaft 110 is able to rotate with little energy supplied. In addition, a timing sensor 116 is configured with the drive shaft 110 to sense the rotational speed of the shaft 110 and to communicate this information to the controller 300 during use.

In some embodiments, the drive shaft 110 preferably includes a square or octagonal cross section to facilitate a secure coupling of the shaft 110 with the central magnet 108 as described in other sections. However, it is understood that the shaft 110 may include other cross sections such as circular.

As is known in the art, an electric generator is a device that converts motive power (mechanical energy associated with the motion and position of an object) into electric power for use in an external circuit. For example, an electric generator may be configured to convert rotational movement of a crank shaft into electrical energy (voltage and current).

Figure 4:
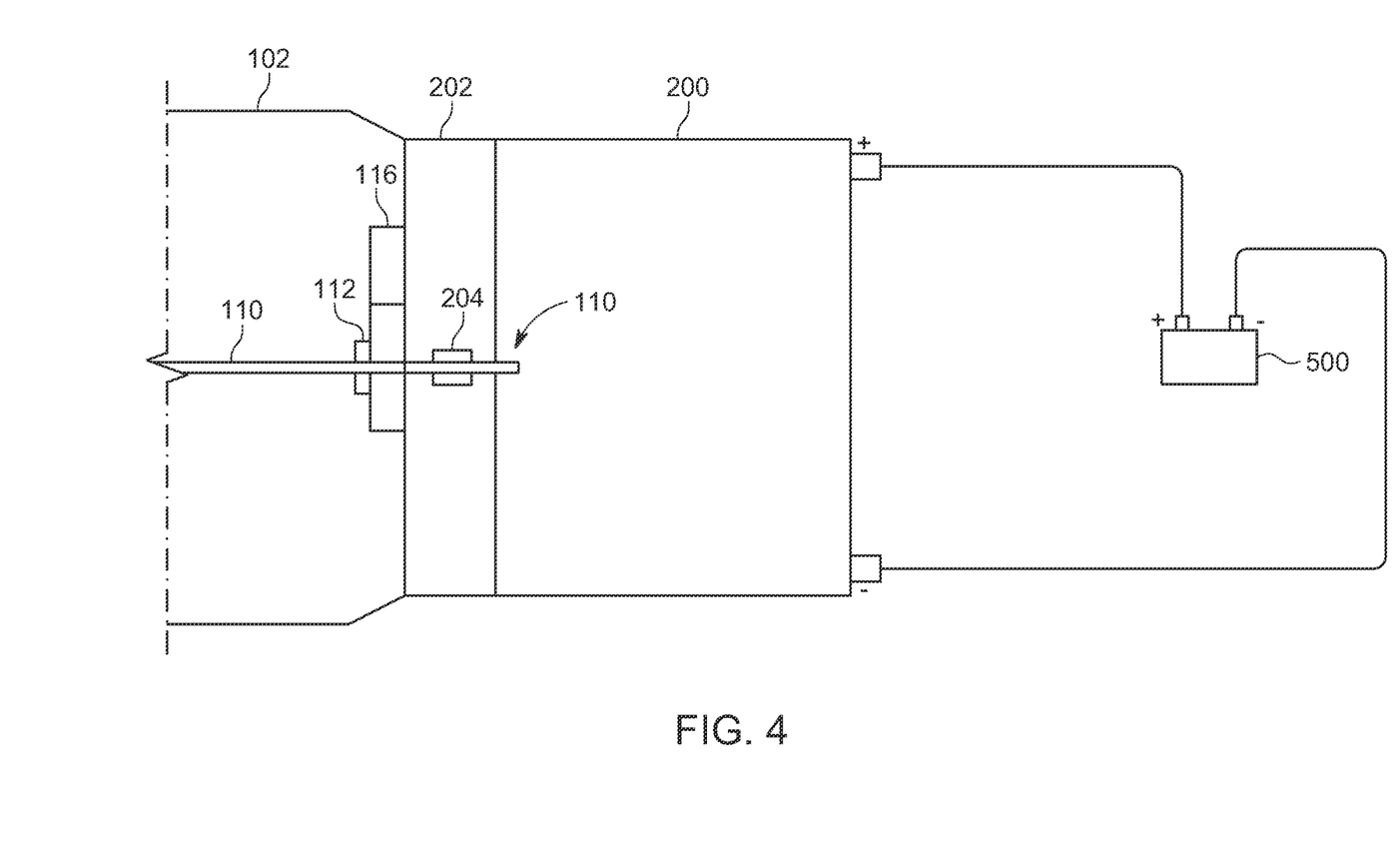
FIG. 4 shows an electric generator configured with an electromagnet movement assembly according to exemplary embodiments hereof.

In some embodiments, as shown in FIGS. 1 and 4, a portion of the crank shaft 110 (e.g., it's left or right end) is configured with (e.g., extends into) the electric generator 200. The electric generator 200 is adapted to engage with the crank shaft 110 and to convert its rotational movement into electrical energy as known in the art.

In some embodiments, as shown in FIGS. 1 and 2, the central magnet 108 is coupled to the crank shaft 110 at an intermediary location along the shaft 110 such that rotational movement of the central magnet 108 in the direction of the arrow B causes a corresponding rotational movement of the crank shaft 110 also in the direction of the arrow B. In some embodiments, the central magnet 108 includes a solid state magnet such as a NdFeB magnet, a Samarium cobalt magnet, and/or an AlNiCo magnet, however, it is understood that any suitable type of magnet 108 may be used.

In some embodiments, the central magnet 108 includes a generally circular cross-section as show in FIG. 2. However, other shaped cross sections also may be used. As shown, it is preferable that the crank shaft 110 passes through (and/or is coupled at each end of the central magnet 108) the central magnet 108 at its center point (i.e., the magnet 108 is center-mounted to the shaft 110). In this way, the combination central magnet 108 and crank shaft 110 is balanced with respect to its rotational movement.

As is known in the art, electromagnets produce a magnetic field proportional to the level of electrical current (among other parameters) provided to the electromagnet.

Figure 3:
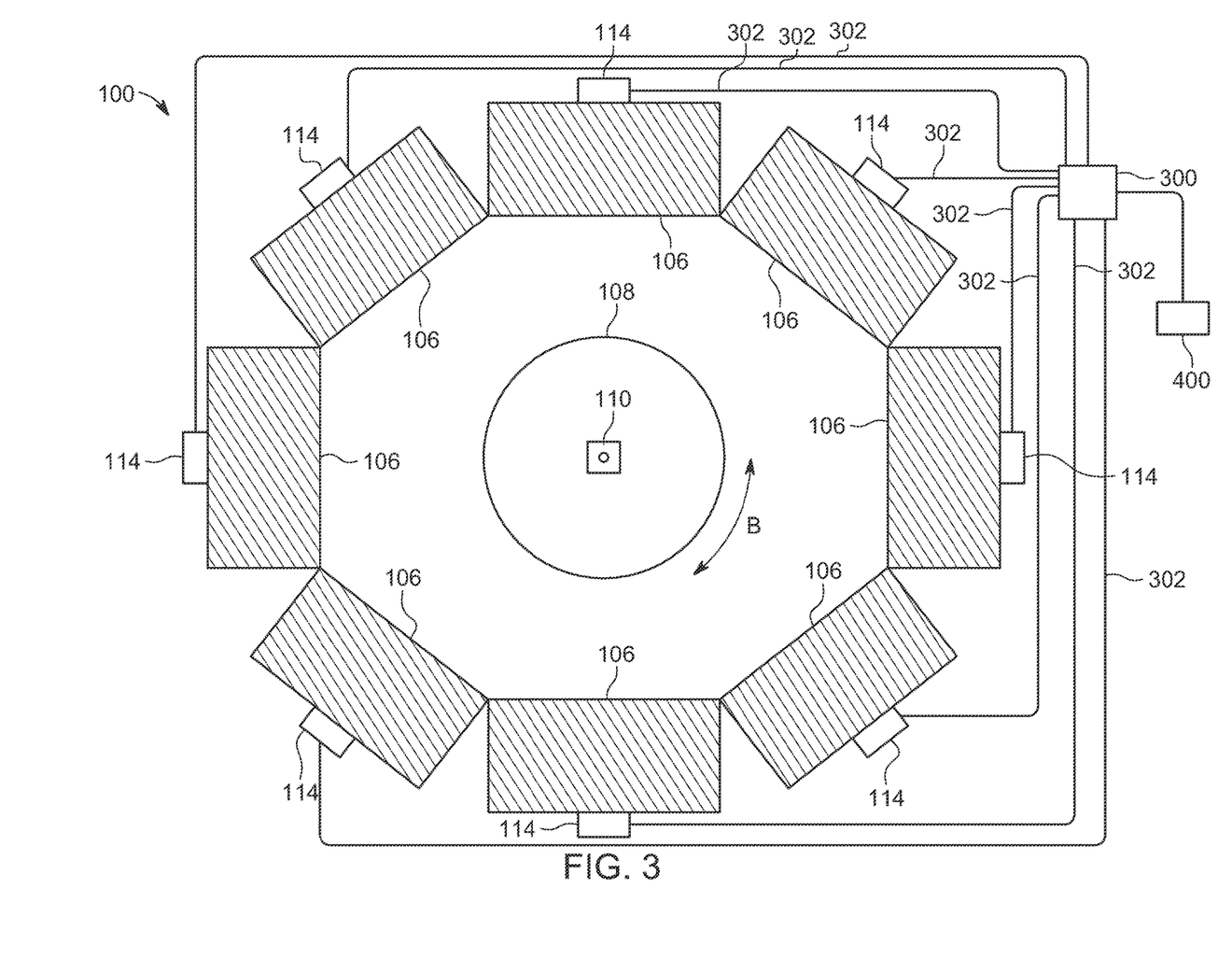
FIG. 3 shows a cutaway top view of an energy generation system according to exemplary embodiments hereof.

In some embodiments, as shown in FIGS. 1-3, a series of electromagnets 106 are configured in an arrangement that generally encircles and is centered about the central magnet 108. In some embodiments, as shown in FIG. 2, a total of eight electromagnets 106 are arranged in an octagonal layout surrounding the central magnet 108. While it may be preferable that the electromagnet movement assembly 100 include 4-12 electromagnets 106, it is understood that any suitable number of electromagnets 106 may be configured in any suitable layout to adequately encircle the central magnet 108 in order to cause the central magnet 108 to rotate as described herein.

In some embodiments, the electromagnets 106 may include round or rectangular flat-faced electromagnets with diameters/widths preferably of 1" or greater and including 10-160 pound pull. The electromagnets 106 may be 12 VDC or greater and may include Bi-Polar electromagnets or any other suitable electromagnets 106.

In some embodiments, as shown in FIGS. 1-3, each electromagnet 106 is electrically configured with a corresponding relay switch 114 (e.g., a 12-24 volt dual output relay) that is configured to provide electrical current to its corresponding electromagnet 108. Accordingly, when a particular relay switch 114 is in its closed position, electrical current may be provided to the electromagnet 106 causing it to produce a magnetic field, and when the particular relay switch 114 is in its open position, electrical current is not provided to the electromagnet 106 causing the magnetic field generated by the electromagnet 106 to cease. Each electromagnet 106 also may include one or more slow release capacitors to provide a small amount of current to the electromagnets to increase the efficiency of the used electrical power.

In some embodiments, as shown in FIGS. 1 and 2, the power source 400 is electrically connected to each relay switch 114 using one or more power cables 402 (e.g., electrical wiring) and is configured to provide electrical current to each electromagnet 106 (via the cables 402 and corresponding relay switch 114) to induce a corresponding magnetic field. In some embodiments, the controller 300 also is electrically connected to each relay switch 114 using one or more control cables 302 (e.g., signal wiring) and is configured to close and/or open each switch 114 via the control cables 302 as desired. In this way, the controller 300 controls when electrical current may be provided to a particular electromagnet 106 (by closing the magnet's 106's relay switch 114) thereby causing a corresponding magnetic field, and when electrical current may not be provided to a particular electromagnet 106 (by opening the magnet's 106's relay switch 114) thereby stopping the corresponding magnetic field.

In some embodiments, as shown in FIGS. 1 and 3, the controller 300 is electrically connected to the power source 400 and is configured to control the level of current (as well as other parameters) that the source 400 may provide to each electromagnet 106 via each corresponding relay switch 114. In this way, the controller 300 may control the current provided to each electromagnet 106 and the resulting strength of the magnetic fields induced by each electromagnet 106.

In some embodiments, the controller 300 activates the relay switches 114 to turn the electromagnets 106 off and on in a specific timing and order. This causes the magnetic fields induced by the electromagnets 106 to cause the central magnet 108 and the drive shaft 110 to rotate.

Figure 5:
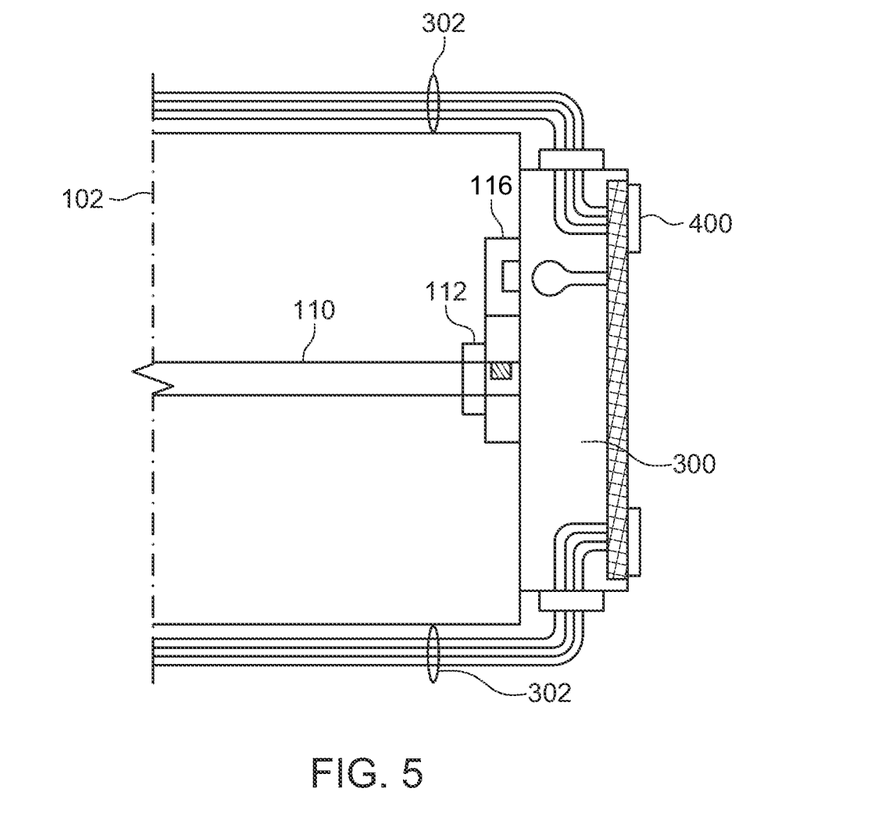
FIG. 5 shows a controller configured with an electromagnet movement assembly according to exemplary embodiments hereof.

As stated in other sections, and as shown in FIGS. 1 and 5, the timing sensor 116 is configured with the drive shaft 110 to sense the rotational speed of the shaft 110 (e.g., rotations per minute (RPM)) and to communicate this information to the controller 300 during use. Based on the rotational information, the controller 300 controls the power source 400 to deliver a desired amount of current to the relay switches 114 and electromagnets 106 to maintain efficiency of the electromagnet movement assembly 100.

As is known in the art, heat may adversely affect the efficiency of the electromagnets 106. In some embodiments, the controller 300 monitors the heat of the electromagnets 106 through the signal wires 302 as shown in FIG. 3 to determine, at least in part, which electromagnet 106 is to be activated next. In some embodiments, the controller 300 may activate one or more electromagnets 106 simultaneously and/or in particular order(s) to maintain optimal rotational speed of the central battery 108 and the shaft 110 based on the operational needs of the generator 200, the power source 400, and the energy storage device 500. In other embodiments, the controller 300 may activate particular electromagnets 106 one at a time.

During startup of the system 10, some or all of the electromagnets 106 may be turned on by the controller 300 simultaneously and/or in a particular order(s) to start rotation of the central magnet 108 and the drive shaft 110. From there, the electromagnets 106 may remain on and/or be turned off and on in a particular order(s) depending on the overall efficiency of the system 10. In some embodiments, heat dampeners also may be installed for optimal efficiency.

In some embodiments, to begin the rotational process, the system 10 may activate one or more electromagnets 106 in a particular order according to a start-up sequence. The start-up sequence may define which electromagnet(s) 106 to activate and the order of activation to cause the central battery 108 and the shaft 110 to begin rotating. Once the start-up sequence is completed and the central battery 108 and the shaft 110 are rotating as desired, the system 10 may maintain the desired rotation by activating one or more electromagnets 106 according to a running sequence. For both the start-up sequences and the running sequences, upon activation of the next electromagnet 106, the prior activated electromagnet 106 may be deactivated.

Figure 8A:
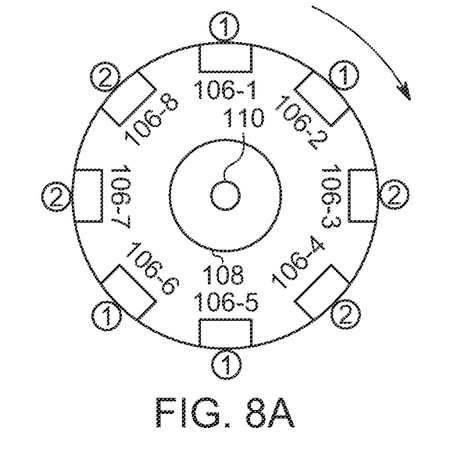
FIG. 8A shows a start-up sequence for activating electromagnets according to exemplary embodiments hereof.

FIG. 8A shows a first exemplary start-up sequence for a system 10 including a total of eight electromagnets 106-1, 106-2, 106-3, . . . 106-8 arranged in an octagonal layout surrounding the central magnet 108. As shown, electromagnets 106-1, 106-2, 106-5, and 106-6 are activated first, followed by the activation of electromagnets 106-3, 106-4, 106-7, and 106-8. In some embodiments, the activated electromagnets 106 may be controlled to remain activated for about 3-5 seconds, after which, the electromagnets 106 may be cycled off and back on according to the pattern described above. This sequence may be repeated as necessary until the central battery 108 and the shaft 110 are rotating as desired.

Figure 8B:
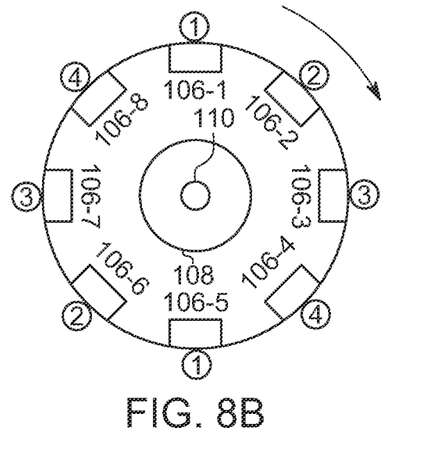
FIG. 8B shows a running sequence of activating electromagnets according to exemplary embodiments hereof.

FIG. 8B shows an exemplary running sequence for the system 10 of FIG. 8A (or FIG. 9A) that the system 10 may implement to maintain a desired rotation once the start-up sequence of FIG. 8A has been completed. As shown, electromagnets 106-1 and 106-5 may be activated first, electromagnets 106-2 and 106-6 may be activated second, electromagnets 106-3 and 106-7 may be activated third, and electromagnets 106-4 and 106-8 may be activated fourth. This sequence may be repeated as long as clockwise rotation of the central battery 108 and of the shaft 110 is desired. In some embodiments, once each electromagnet 108 is turned on for about 0.01 seconds to about 3 seconds, and preferably about 0.1 seconds to about 2 seconds.

Figure 9A:
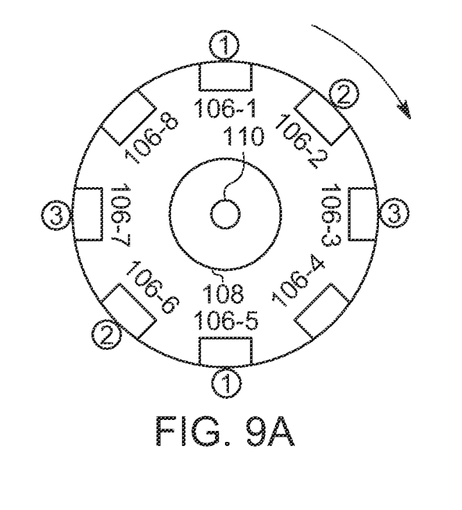
FIG. 9A shows a start-up sequence of activating electromagnets according to exemplary embodiments hereof.

FIG. 9A shows a second exemplary start-up sequence for a system 10 including a total of eight electromagnets 106-1, 106-2, 106-3, . . . 106-8 arranged in an octagonal layout surrounding the central magnet 108. As shown, electromagnets 106-1 and 106-5 are activated first, electromagnets 106-2 and 106-6 are activated next, and electromagnets 106-3 and 106-7 are activated last. In some embodiments, the activated electromagnets 106 may be controlled to remain activated for about 3-5 seconds, after which, the electromagnets 106 may be cycled off and back on according to the pattern described above. This sequence may be repeated as necessary until the central battery 108 and the shaft 110 are rotating as desired.

Figure 9B:
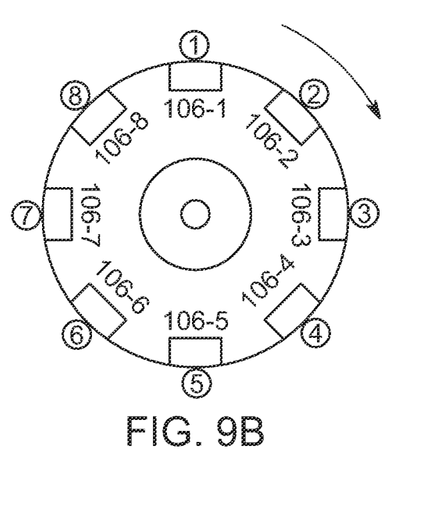
FIG. 9B shows a running sequence of activating electromagnets according to exemplary embodiments hereof.

FIG. 9B shows an exemplary running sequence for the system 10 of FIG. 9A (or FIG. 8A) that the system 10 may implement to maintain a desired rotation once the start-up sequence of FIG. 9A has been completed. As shown, electromagnet 106-1 be activated first, electromagnet 106-2 may be activated second, electromagnet 106-3 may be activated third, electromagnet 106-4 may be activated fourth, electromagnet 106-5 may be activated fifth, electromagnet 106-6 may be activated sixth, electromagnet 106-7 may be activated seventh, and electromagnet 106-8 may be activated eighth. This sequence may be repeated as long as clockwise rotation of the central battery 108 and of the shaft 110 is desired. In some embodiments, once each electromagnet 108 is turned on for about 0.01 seconds to about 3 seconds, and preferably about 0.1 seconds to about 2 seconds.

Figure 10:
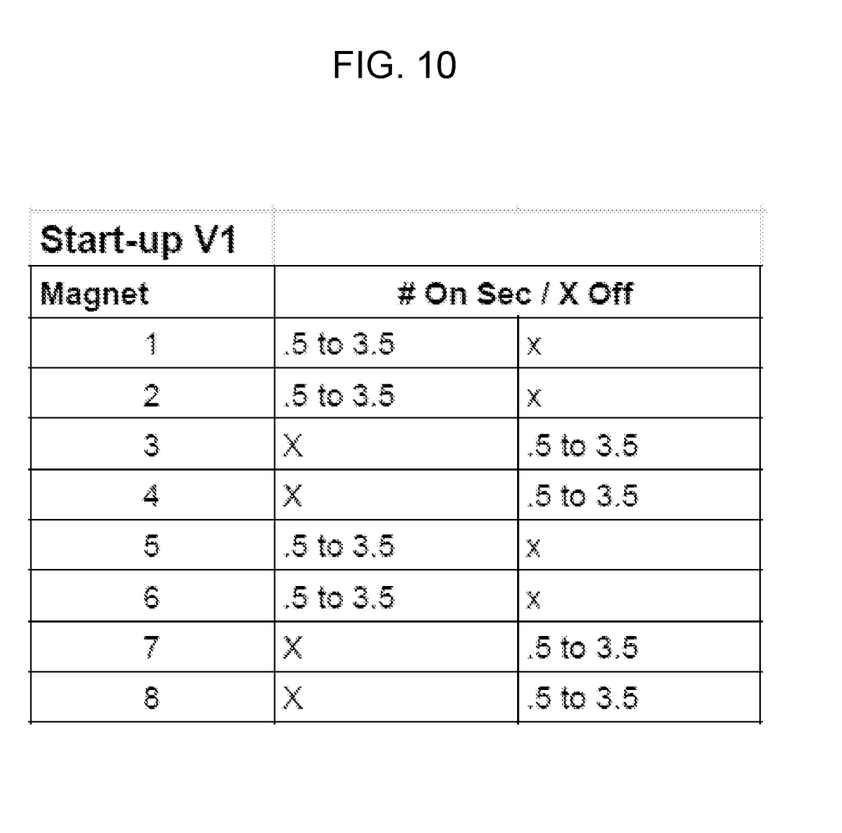
FIG. 10 shows a start-up sequence for activating electromagnets according to exemplary embodiments hereof.

FIG. 10 shows a tabular representation of the start-up sequence shown in FIG. 8A. The first column represents the electromagnets 106-1 through 106-8 (shown as magnets 1-8, respectively), the second column represents the electromagnets 106 that are to be turned on first in the sequence and the amount of time each electromagnet 106 should remain on (with "X" representing electromagnets 106 that are off), and the third column represents the electromagnets 106 that are to be turned on second in the sequence after the first set of electromagnets 106 have been cycled and then turned off. In some embodiments, the second set of magnets 106 are cycled on simultaneously as the first set of magnets are turned off. This sequence may be repeated as necessary until the central battery 108 and the shaft 110 are rotating as desired.

Figure 11:
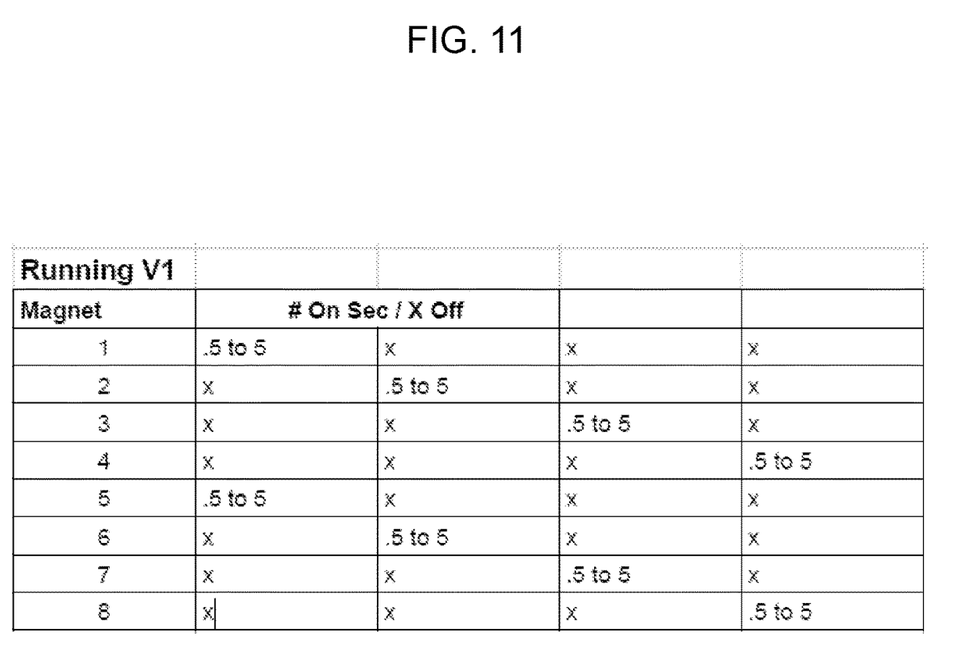
FIG. 11 shows a running sequence of activating electromagnets according to exemplary embodiments hereof.

FIG. 11 shows a tabular representation of the running sequence shown in FIG. 8B. The first column represents the electromagnets 106-1 through 106-8 (shown as magnets 1-8, respectively), the second column represents the electromagnets 106 that are to be turned on first in the sequence and the amount of time each electromagnet 106 should remain on (with "X" representing electromagnets 106 that are off), the third column represents the electromagnets 106 that are to be turned on second in the sequence after the first set of electromagnets 106 have been cycled and then turned off, the fourth column represents the electromagnets 106 that are to be turned on third in the sequence after the second set of electromagnets 106 have been cycled and then turned off, and the fifth column represents the electromagnets 106 that are to be turned on fourth in the sequence after the third set of electromagnets 106 have been cycled and then turned off. In some embodiments, the magnets 106 are cycled on simultaneously as the previous set of magnets are turned off. This sequence may be repeated to continue the central magnet 108 and the shaft 110 rotating.

Figure 12:
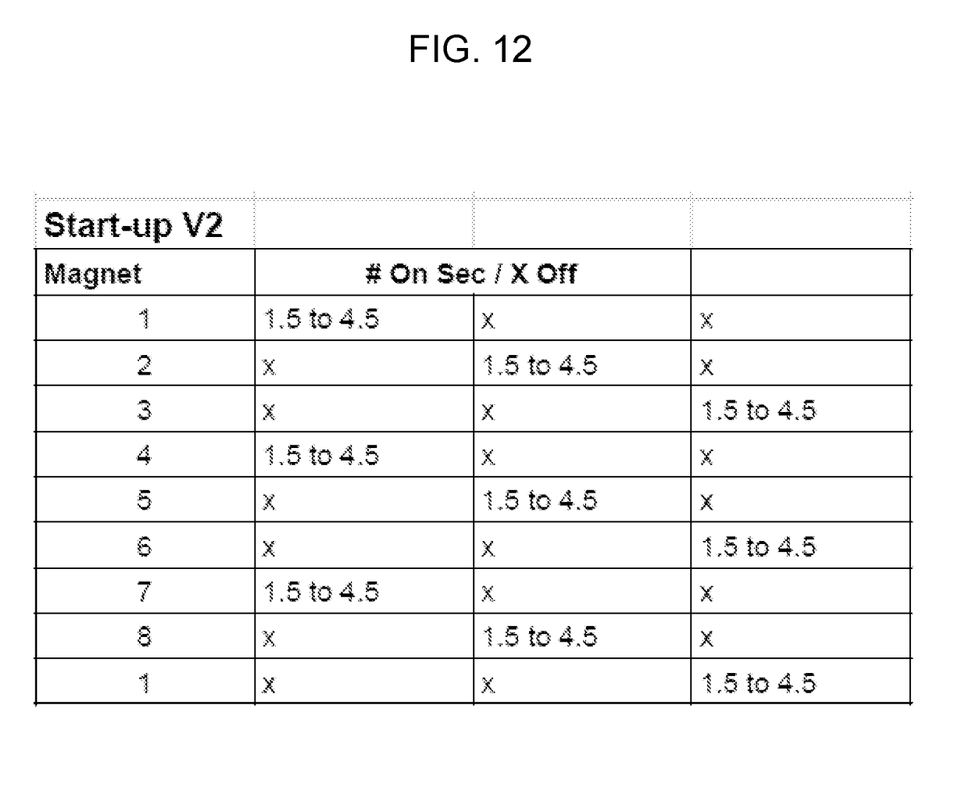
FIG. 12 shows a start-up sequence of activating electromagnets according to exemplary embodiments hereof.

FIG. 12 shows a tabular representation of a start-up sequence similar to the sequence shown in FIG. 9A but slightly different. The first column represents the electromagnets 106-1 through 106-8 (shown as magnets 1-8, respectively), with the first electromagnet 106-1 (magnet 1) repeated at the end, the second column represents the electromagnets 106 that are to be turned on first in the sequence and the amount of time each electromagnet 106 should remain on (with "X" representing electromagnets 106 that are off), the third column represents the electromagnets 106 that are to be turned on second in the sequence after the first set of electromagnets 106 have been cycled and then turned off, and the fourth column represents the electromagnets 106 that are to be turned on third in the sequence after the second set of electromagnets 106 have been cycled and then turned off. Notably, the first magnet 106-1 (magnet 1) is turned on a second time in the sequence as shown in the fourth column. In some embodiments, the magnets 106 are cycled on simultaneously as the previous set of magnets are turned off. This sequence may be repeated to continue the central magnet 108 and the shaft 110 rotating.

Figure 13:
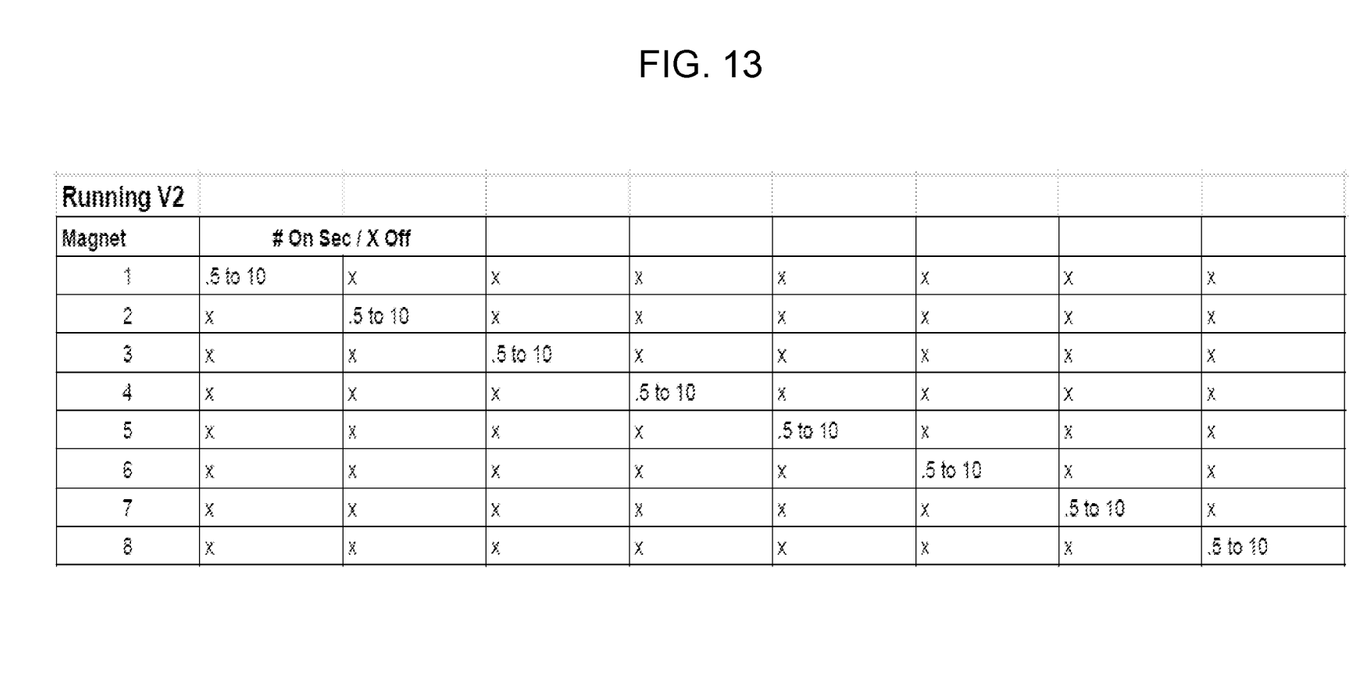
FIG. 13 shows a running sequence of activating electromagnets according to exemplary embodiments hereof.

FIG. 13 shows a tabular representation of the running sequence shown in FIG. 9B. The first column represents the electromagnets 106-1 through 106-8 (shown as magnets 1-8, respectively), the second column represents the electromagnets 106 that are to be turned on first in the sequence and the amount of time each electromagnet 106 should remain on (with "X" representing electromagnets 106 that are off), the third column represents the electromagnets 106 that are to be turned on second in the sequence after the first set of electromagnets 106 have been cycled and then turned off, the fourth column represents the electromagnets 106 that are to be turned on third in the sequence after the second set of electromagnets 106 have been cycled and then turned off, the fifth column represents the electromagnets 106 that are to be turned on fourth in the sequence after the third set of electromagnets 106 have been cycled and then turned off, the sixth column represents the electromagnets 106 that are to be turned on fifth in the sequence after the fourth set of electromagnets 106 have been cycled and then turned off, the seventh column represents the electromagnets 106 that are to be turned on sixth in the sequence after the fifth set of electromagnets 106 have been cycled and then turned off, the eighth column represents the electromagnets 106 that are to be turned on seventh in the sequence after the sixth set of electromagnets 106 have been cycled and then turned off, and the ninth column represents the electromagnets 106 that are to be turned on eighth in the sequence after the seventh set of electromagnets 106 have been cycled and then turned off. In some embodiments, the magnets 106 are cycled on simultaneously as the previous set of magnets are turned off. This sequence may be repeated to continue the central magnet 108 and the shaft 110 rotating.

Notably, the start-up sequences shown in FIGS. 8A, 9A, 10, and 12, and the running sequences shown in FIGS. 8B, 9B, 11, and 13 cause the central battery 108 and the shaft 110 to rotate in a clockwise direction. To start and cause the central battery 108 and the shaft 110 to rotate in a counter-clockwise direction, the electromagnets 106 may be activated in the reverse orders shown and described.

Figure 6:
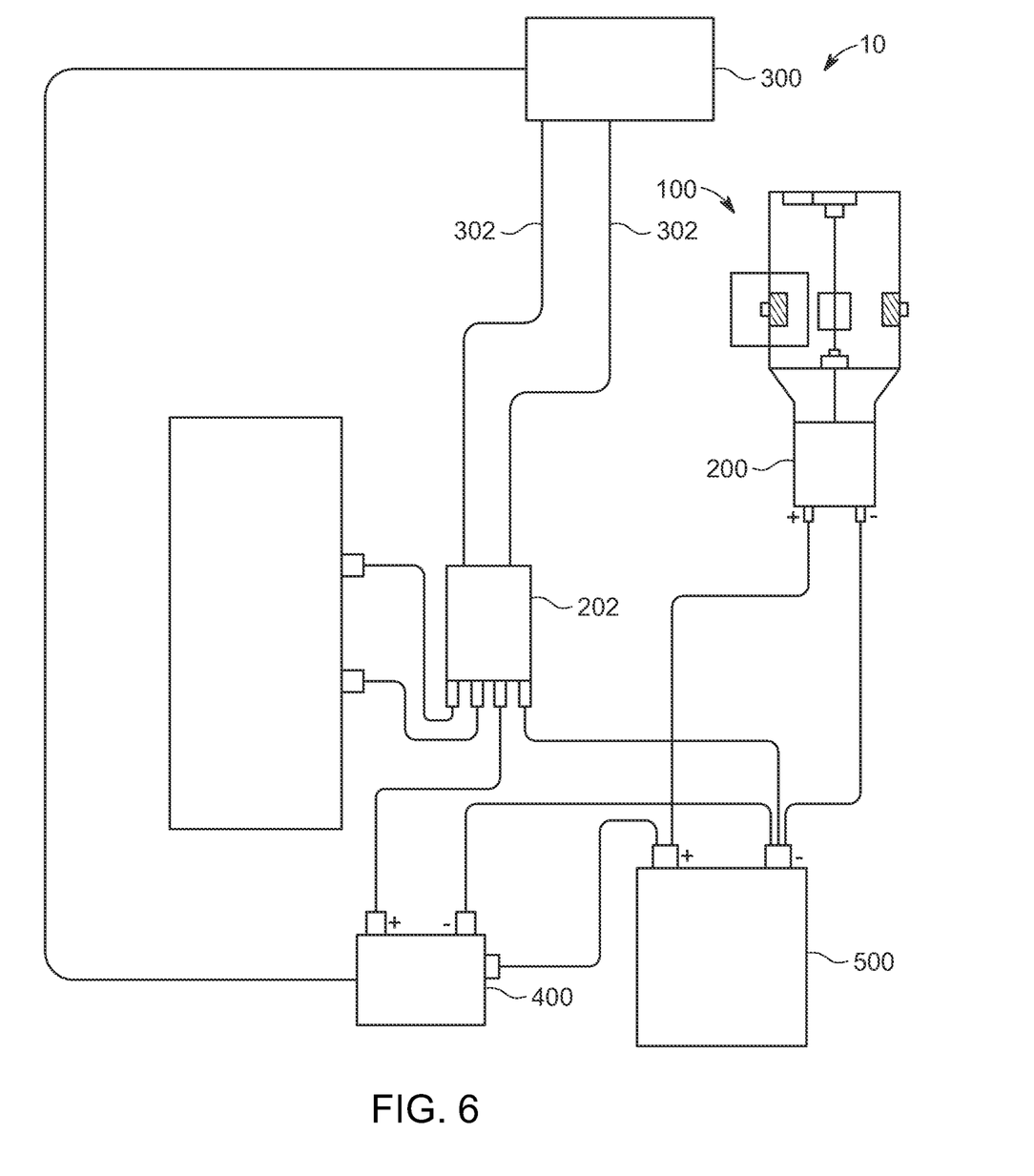
FIG. 6 shows a diagram of an energy generation system according to exemplary embodiments hereof.

As stated in other sections, the electric generator 200 converts the rotational movement of the drive shaft 110 into electrical energy. In some embodiments, as shown in FIG. 6, the resulting electrical energy may then be provided to the power source 400 for recharging of the source 400 and/or to the energy storage device 500 for storing of the generated energy via relay switch 202. This may be performed in alternation or simultaneously depending on electrical load requirements. For example, generated electrical energy may be used to charge the power source 400 while the energy storage device 500 is being used to power an external element, and switched via the relay switch 202 to recharge the energy storage device 500 when the device 500 requires recharging. Multiple batteries also may be used to regulate electrical loads. In some embodiments, the power source 400 and the energy storage device 500 may include batteries such as lithium ion (Li-ion) batteries and/or any other suitable types of batteries or devices.

In some embodiments, the controller 300 monitors the energy levels of the power source 400 and/or the energy storage device 500 and determines when to switch from stopped, start up, charging and other requirements.

Figure 7:
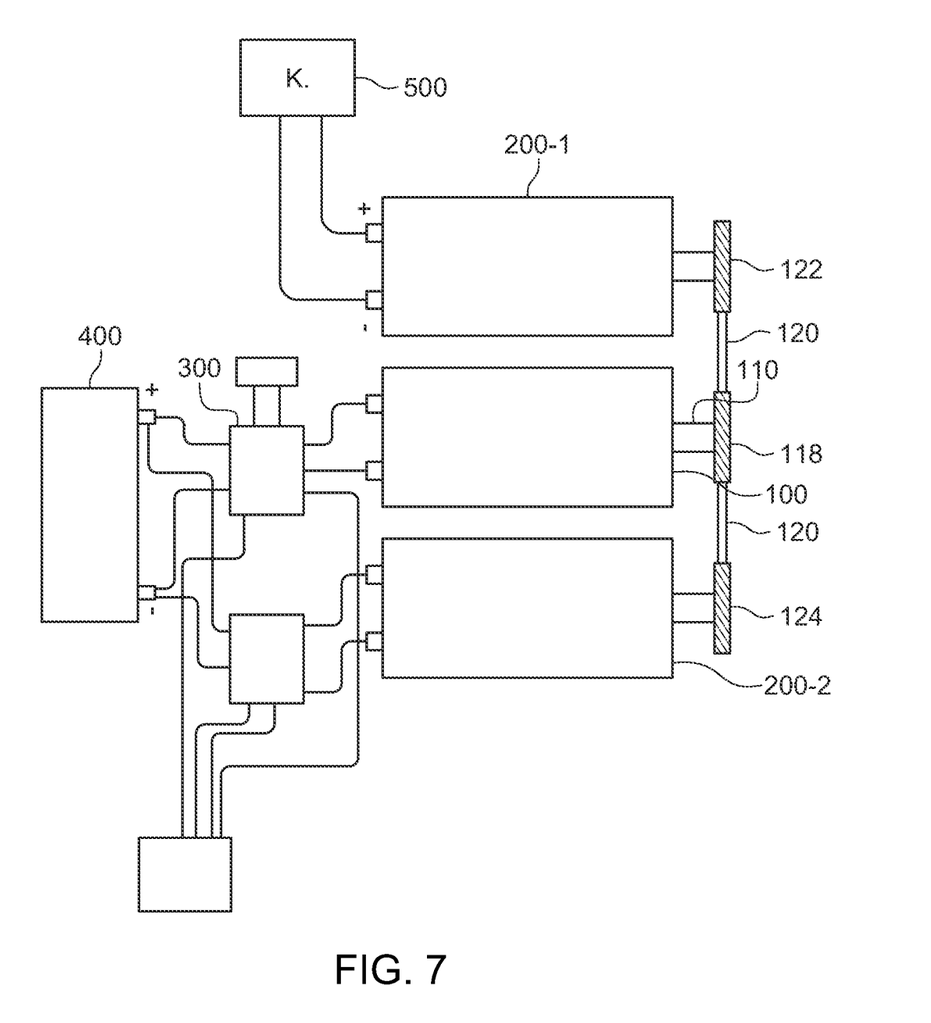
FIG. 7 shows an alternative embodiment of an energy generation system according to exemplary embodiments hereof.

In some embodiments, as shown in FIG. 7, the system 10 includes an electromagnet movement assembly 100, a first electric generator 200-1, a second electric generator 200-2, a controller 300, a power source 400, and an energy storage device 500. In this embodiment, the drive shaft 110 of the electromagnet movement assembly 100 is configured with a first sprocket 118 configured to turn a chain or belt 120. The chain or belt 120 also is configured to turn a second sprocket 122 which is configured with the first electric generator 200-1, and to turn a third sprocket 124 which is configured with the second electric generator 200-2. The first electric generator 200-1 converts the rotational movement of the second sprocket 122 into electrical energy and supplies the electrical energy to the power storage device 500. The second electric generator 200-2 converts the rotational movement of the third sprocket 124 into electrical energy and supplies the electrical energy to the power supply 400. In this way, both the power storage device 500 and the power source 400 are charged simultaneously. In this way, the system 10 effectively amplifies energy provided by the power source 400 and stores the resulting excess energy to the power storage device 500. The system 10 of this embodiment also includes the other elements of the system 10 as described herein as necessary.

Applications of the system 10, include, and are not limited to:

Application 1: Electrical vehicles;

Application 2: Community-wide electrical generation to battle climate change;

Application 3: Home electrical power generation;

Application 4: Emergency backup power for essential services;

Application 5: Extended drone flying capabilities (military & civilian); and

Application 7: Space travel.

It is understood that any aspect and/or element of any embodiment of the assembly 10 described herein or otherwise may be combined in any way to form additional embodiments of the assembly 10 all of which are within the scope of the assembly 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. An energy generating system comprising:
   a drive shaft configured to rotate and including a shaft center of rotation;
   a first magnet coupled to the drive shaft, the shaft center of rotation passing through a center of the first magnet;
   a plurality of electromagnets assembled to encircle the first magnet, each one of the plurality of electromagnets configured with a corresponding relay switch;
   an electric generator configured with the drive shaft and adapted to convert rotational movement of the drive shaft into electrical energy;
   a power source electrically configured with each relay switch; and
   a controller configured to selectively activate one or more of the relay switches according to one or more predetermined timing patterns;
   wherein at least one of the plurality of electromagnets produces a magnetic force that causes the first magnet and the drive shaft to rotate.

2. The energy generating system of claim 1 further comprising a power storage device configured with the electric generator and adapted to store the electrical energy.

3. The energy generating system of claim 1 wherein the plurality of electromagnets includes a total of eight electromagnets.

4. The energy generating system of claim 3 wherein the eight electromagnets are arranged in an octagonal layout about the first magnet.

5. The energy generating system of claim 1 wherein a first one of the one or more predetermined timing patterns includes a start-up sequence of electromagnet activations.

6. The energy generating system of claim 1 wherein a first one of the one or more predetermined timing patterns includes a running sequence of electromagnet activations.

7. The energy generating system of claim 1 further comprising a timing sensor configured with the drive shaft and adapted to sense a rotational speed of the drive shaft.

8. The energy generating system of claim 1 wherein the plurality of electromagnets includes a first electromagnet, a second electromagnet, a third electromagnet, a fourth electromagnet, a fifth electromagnet, a sixth electromagnet, a seventh electromagnet, and an eighth electromagnet, and wherein the controller includes at least one processor, at least one non-transitory memory unit coupled with the at least one processor, computer readable instructions embodied in the memory unit and executable by the processor, wherein execution of the instructions by the processor causes the controller to perform a method, the method comprising:
   activating the first, second, fifth, and sixth electromagnets;
   deactivating the first, second, fifth, and sixth electromagnets;
   activating the third, fourth, seventh, and eighth electromagnets;
   deactivating the third, fourth, seventh, and eighth electromagnets.

9. The energy generating system of claim 1 wherein the plurality of electromagnets includes a first electromagnet, a second electromagnet, a third electromagnet, a fourth electromagnet, a fifth electromagnet, a sixth electromagnet, a seventh electromagnet, and an eighth electromagnet, and wherein the controller includes at least one processor, at least one non-transitory memory unit coupled with the at least one processor, computer readable instructions embodied in the memory unit and executable by the processor, wherein execution of the instructions by the processor causes the controller to perform a method, the method comprising:
   activating the first and fifth electromagnets;
   deactivating the first and fifth electromagnets;
   activating the second and sixth electromagnets;

deactivating the second and sixth electromagnets;
activating the third and seventh electromagnets;
deactivating the third and seventh electromagnets.

10. The energy generating system of claim 1 wherein the plurality of electromagnets includes a first electromagnet, a second electromagnet, a third electromagnet, a fourth electromagnet, a fifth electromagnet, a sixth electromagnet, a seventh electromagnet, and an eighth electromagnet, and wherein the controller includes at least one processor, at least one non-transitory memory unit coupled with the at least one processor, computer readable instructions embodied in the memory unit and executable by the processor, wherein execution of the instructions by the processor causes the controller to perform a method, the method comprising:
activating the first electromagnet;
deactivating the first electromagnet;
activating the second electromagnet;
deactivating the second electromagnet;
activating the third electromagnet;
deactivating the third electromagnet;
activating the fourth electromagnet;
deactivating the fourth electromagnet;
activating the fifth electromagnet;
deactivating the fifth electromagnet;
activating the sixth electromagnet;
deactivating the sixth electromagnet.

11. A method of generating energy comprising:
(A) providing a drive shaft configured to rotate and including a shaft center of rotation;
(B) coupling a first magnet to the drive shaft with the shaft center of rotation passing through a center of the first magnet;
(C) providing a plurality of electromagnets in an encircling arrangement about the first magnet, each one of the plurality of electromagnets configured with a corresponding relay switch;
(D) configuring an electric generator with the drive shaft adapted to convert rotational movement of the drive shaft into electrical energy;
(E) providing, using a power source, electrical energy to each relay switch;
(F) causing a controller to selectively activate one or more of the relay switches according to one or more predetermined timing patterns;
wherein at least one of the plurality of electromagnets produces a magnetic force that causes the first magnet and the drive shaft to rotate.

12. The method of claim 11 further comprising:
(G) configuring a power storage device with the electric generator to store the electrical energy.

13. The method of claim 11 wherein the plurality of electromagnets includes a total of eight electromagnets.

14. The method of claim 13 wherein the eight electromagnets are arranged in an octagonal layout about the first magnet.

15. The method of claim 11 wherein one of the one or more predetermined timing patterns includes a start-up sequence of electromagnet activations.

16. The method of claim 11 wherein one of the one or more predetermined timing patterns includes a running sequence of electromagnet activations.

17. The method of claim 11 further comprising:
configuring a timing sensor with the drive shaft to sense a rotational speed of the drive shaft.

18. The method of claim 11 wherein the plurality of electromagnets includes a first electromagnet, a second electromagnet, a third electromagnet, a fourth electromagnet, a fifth electromagnet, a sixth electromagnet, a seventh electromagnet, and an eighth electromagnet, and wherein one of the one or more predetermined timing patterns includes:
activating the first, second, fifth, and sixth electromagnets;
deactivating the first, second, fifth, and sixth electromagnets;
activating the third, fourth, seventh, and eighth electromagnets;
deactivating the third, fourth, seventh, and eighth electromagnets.

19. The method of claim 11 wherein the plurality of electromagnets includes a first electromagnet, a second electromagnet, a third electromagnet, a fourth electromagnet, a fifth electromagnet, a sixth electromagnet, a seventh electromagnet, and an eighth electromagnet, and wherein one of the one or more predetermined timing patterns includes:
activating the first and fifth electromagnets;
deactivating the first and fifth electromagnets;
activating the second and sixth electromagnets;
deactivating the second and sixth electromagnets;
activating the third and seventh electromagnets;
deactivating the third and seventh electromagnets.

20. The method of claim 11 wherein the plurality of electromagnets includes a first electromagnet, a second electromagnet, a third electromagnet, a fourth electromagnet, a fifth electromagnet, a sixth electromagnet, a seventh electromagnet, and an eighth electromagnet, and wherein one of the one or more predetermined timing patterns includes:
activating the first electromagnet;
deactivating the first electromagnet;
activating the second electromagnet;
deactivating the second electromagnet;
activating the third electromagnet;
deactivating the third electromagnet;
activating the fourth electromagnet;
deactivating the fourth electromagnet;
activating the fifth electromagnet;
deactivating the fifth electromagnet;
activating the sixth electromagnet;
deactivating the sixth electromagnet.

* * * * *